United States Patent Office 3,799,962
Patented Mar. 26, 1974

3,799,962
ALKOXYSILOXANOLS
Richard Newton Lewis, Tecumseh, Mich., assignor to Stauffer Chemical Company
No Drawing. Filed Dec. 30, 1971, Ser. No. 214,406
Int. Cl. C07f 7/18
U.S. Cl. 260—448.8 R         12 Claims

ABSTRACT OF THE DISCLOSURE

Alpha-alkoxy-omega-siloxanols, R'O(R$_2$SiO)$_x$H, are produced by contacting cyclic siloxanes with alcohols under mild conditions. For example, hexamethylcyclotrisiloxane heated at reflux in methanol for four hours gives 5 - methoxyhexamethyltrisiloxan-1-ol in high yield. The reaction proceeds more rapidly in the presence of weak acids or bases. The products are useful as antistructure agents, coupling agents, and filler-treating agents for silicone elastomers.

---

This invention relates to alkoxysiloxanols and more particularly to alpha-alkoxy-omega-siloxanols. Such materials contain one relatively more reactive group (OH) and one relatively less reactive group (alkoxy); for this reason they have long been sought as intermediates in the synthesis of siloxanes. They have not, however, been available by any process known heretofore.

Several processes that might have been expected to lead to alkoxysiloxanols have instead produced other products. For example, linear and cyclic methylpolysiloxanes heated with methanol in the presence of potassium hydroxide gave instead trimethylalkoxysilanes and dimethyldimethoxysilanes (U.S. Pats. 2,746,982 and 2,826,599). Cyclic trisiloxanes heated with n-octyl alcohol and toluenesulfonic acid in xylene gave dioctyloxytrisiloxanes and water as the principal products, even when the reaction was stopped at an early stage. [See Sprung and Guenther, J. Org. Chem. 26, 552 (1961)].

It is an object of this invention to provide alkoxysiloxanols. Another object of this invention is to provide alpha-alkoxy-omega-siloxanols. It is also an object of this invention to provide a method of producing alpha-alkoxy-omega-siloxanols in high yield and in a high state of purity. It is a further object of this invention to provide novel antistructure agents, coupling agents and filler-treating agents.

These objects, and others which will become apparent from the following description, are achieved, generally speaking, by contacting a cyclic polysiloxane with an alcohol having up to 20 carbon atoms under relatively mild conditions to form a compound of the general formula R'O(R$_2$SiO)$_x$H, wherein R and R' are organic radicals and $x$ is an integer of at least 2 and preferably from 2 to 10. In some cases satisfactory results are obtained without a catalyst. In other cases it is advantageous to employ a weak base or a weak acid as a catalyst.

The cyclic polysiloxanes that may be used in the practice of this invention have the general formula (R$_2$SiO)$_y$. The radicals represented by R in this formula are hydrocarbon radicals, halogenated hydrocarbon radicals or cyanoalkyl radicals having from 1 to 8 carbon atoms. Suitable radicals include alkyl radicals such as methyl, ethyl, propyl, butyl or hexyl and fluorinated derivatives thereof; alkenyl radicals such as vinyl or allyl; and aryl radicals such as phenyl or tolyl and chlorinated derivatives thereof. It is preferred that at least half of the radicals be methyl radicals. Very good results are obtained if all of the radicals are methyl.

The number of units, y, in the cyclic polysiloxane is at least 3 and may be as high as 10. Generally the fastness and cleanest reaction occurs when $y$ is 3. However, very good results are also obtained when $y$ is 4 or 5 or even more. Suitable cyclic polysiloxanes thus include those of the general formula [(CH$_3$)$_2$SiO]$_y$, where $y$ is from 3 to 10, particularly when $y$ is 3, 4 or 5. Other cyclic polysiloxanes that may be used include those having groups other than methyl; for example, trimethyltrivinylcyclotrisiloxane,
tetramethyltetravinylcyclotetrasiloxane,
heptamethylvinylcyclotetrasiloxane,
trimethyltriethylcyclotrisiloxane,
trimethyltriphenylcyclotrisiloxane,
hexaphenylcyclotrisiloxane, and the like.

Alcohols of almost every description may be used in the practice of this invention. Long-chain or short-chain alkyl, cycloalkyl, alkenyl and aralkyl alcohols and substituted derivatives thereof having up to 20 carbon atoms, including allyl alcohol and benzyl alcohol may be used. Substituted alcohols such as ethanolamine, 2-methoxyethanol, and 2-chloroethanol may also be used. Best results are usually obtained with the short-chain primary and secondary alcohols having up to 4 carbon atoms, e.g. methyl, ethyl, n-propyl, isopropyl, n-butyl, or isobutyl alcohol. The cleanest and fastest reactions, with fewest side reactions, occur with methyl alcohol.

The general reaction may be expressed by the equation

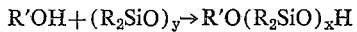

$$R'OH + (R_2SiO)_y \rightarrow R'O(R_2SiO)_xH$$

In this equation R' represents the radical of an alcohol having up to 20 carbon atoms. Generally $x$ is equal to $y$. Under certain conditions, $x$ may have values greater than or less than $y$. It is preferred to work with a large excess of the alcohol, or the reaction may be very slow. Mole ratios of alcohol to cyclic polysiloxane should be between 2:1 and 50:1, preferably at least 5:1. Ratios higher than 50:1 may be employed, but offer no special advantage.

Reaction temperature is not critical. A reasonable rate of reaction can usually be achieved at room temperature or below. Often it is preferred to operate at somewhat higher temperatures, but generally not much over 100° C. The reflux temperature of the alcohol is often a satisfactory operating temperature. If higher temperatures are desired, the reactions may be conducted under moderate pressure, but this is not usually necessary.

In some instances, as in the reaction of methanol with a cyclic trisiloxane, no catalyst is required, and the reaction proceeds at a satisfactory rate at the reflux temperature of the methanol.

When a catalyst is desired a weak acid or a weak base may be added, as indicated above. Strong acids such as toluenesulfonic acid and strong bases such as sodium methoxide are completely unsatisfactory as they cause unwanted cleavage and equilibration reactions. Even moderately strong acids such as oxalic acid (pK$_a$ 1.23) cause rapid decomposition of the alkoxysiloxanol that is produced and are of borderline utility. For optimum utility the catalyst should have a pK$_a$ or pK$_b$ above 1.5, corresponding to an acid or basic dissociation constant below 0.03. Maleic acid (pK$_a$ 1.83) and phosphoric acid (pK$_a$ 2.12) are about the strongest acids that can be used with safety. Even so they must be quickly neutralized when the desired reaction has been essentially completed. In general, any organic or inorganic acid or base may be used if its pK$_a$ or pK$_b$ lies between 1.5 and 10. Extremely weak acids or bases with pK values above 10 are relatively ineffective.

In order to eliminate the neutralization step, it is advantageous to use an acid or base that is volatile, so that it can be removed by distillation. A catalyst that decomposes into harmless by-products on heating is also desirable. Suitable acid catalysts include formic acid (pK$_a$ 3.75), acetic acid ($pK_a$ 4.75), propionic acid ($pK_a$ 4.87), malonic acid ($pK_a$ 2.83), succinic acid ($pK_a$ 4.16), and cyanoacetic acid ($pK_a$ 2.45).

Suitable bases include the primary, secondary, and tertiary aliphatic amines, which have $pK_b$ values in the range of about 1.95 (diisopropylamine) to 4.26 (trimethylamine); ammonia ($pK_b$ 4.75); ethanolamine and its alkyl derivatives; pyrrolidine, piperidine, and their homologs; morpholine ($pK_b$ 5.4), N-methylmorpholine ($pK_b$ 6.5), and N-ethylmorpholine ($pK_b$ 6.2); ethylenediamine ($pK_b$ 4.07) and its n-alkyl derivatives; piperazine ($pK_b$ 4.1) and dimethylpiperazine ($pK_b$ 5.8); pyridine ($pK_b$ 8.77); and aromatic amines such as dimethylamine ($pK_b$ 8.94). Ammonia and the more volatile amines are particularly preferred because of their easy removal.

Salts of weak acids and bases may also be used, but they are less easily removed than the acids and bases listed above, and are therefore not usually preferred.

The catalysts listed above are effective at relatively low concentrations. Concentrations up to five percent may be used, but the preferred range is from 0.01 to 1.0 percent.

In order to purify the alkoxysiloxanols the excess of alcohol is removed by distillation at atmospheric or reduced pressure. Unreacted cyclic polysiloxane, if any, is best removed by vacuum distillation. The alkoxysiloxanol left in the distillation pot at this stage is often enough for most purposes. Further purification, if desired, may be achieved by distilling the alkoxysiloxanol at reduced pressure. Products of essentially 100 percent purity can thus be obtained.

The alkoxysiloxanols of this invention are useful as chemical intermediates, as antistructure agents in silica-filled elastomers, and as agents for reducing the surface reactivity of inorganic fillers, especially siliceous fillers. Suitably treated fillers may be obtained by heating untreated fillers with alkoxysiloxanols, preferably in the range of 50 to 200° C. The hydrophobic fillers thus obtained are very useful in the preparation of high-strength silicone elastomers.

Alkoxysiloxanols that contain vinyl groups, e.g. 5-methoxytrimethyltrivinyltrisiloxan-1-ol, are particularly useful as coupling agents between inorganic materials such as fillers and fibrous reinforcing agents, e.g. glass fibers, and organic polymers, especially those that are cured by free-radical or vinyl-addition reactions. Examples include silica-reinforced elastomers of various types and glass-reinforced polyesters.

The following examples are offered by way of illustration, but not by way of limitation. In these examples the dimethylsiloxane unit, $(CH_3)_2SiO$, is represented by the symbol D, and the methylvinylsiloxane unit, $CH_3C_2H_3SiO$, is represented by the symbol $D^V$. All parts are by weight unless otherwise specified.

EXAMPLE 1

Hexamethylcyclotrisiloxane ($D_3$) (22.2 parts) was dissolved in 120 parts of methanol and heated at reflux for hour hours. Analysis by gas chromatography showed, in addition to methanol, 91.0 percent 5-methoxy-hexamethyl-trisiloxan-1-ol ($CH_3OD_3H$), 7.5 percent unreacted $D_3$, and 1.5 percent 3-methoxy-tetramethyldisiloxan-1-ol ($CH_3OD_2H$), the latter indicating a slight amount of additional cleavage of the trisiloxanol. There was no evidence of symmetrical siloxanes such as a dimethoxytrisiloxane or a trisiloxanediol. On distillation at reduced pressure a nearly pure fraction of $CH_3OD_3H$ was obtained boiling at 86° C. (15 mm.). Absorption in the near infrared showed strong, sharp OH peaks at 2700 nm. and 2900 nm. Nuclear magnetic resonance showed the group ratios $CH_3(Si)$ 6.0, $CH_3O$ 1.1, OH 1.0; theoretical 6:1:1.

EXAMPLE 2

Ten parts of 1,3,5-trimethyl-1,3,5-trivinylcyclotrisiloxane ($D^V_3$) was mixed with 70 parts of methanol and 0.35 part of formic acid and allowed to stand at room temperature for 4 days. The methanol was then removed under vacuum below room temperature, and the remainder was distilled at 1.6 mm., giving 8.1 parts of a product boiling at 78–89° C. Analysis by gas chromatography of the product showed 7.6 percent of 3-methoxy-1,3-dimethyl-1,3-divinyl-disiloxan-1-ol ($CH_3OD^V_2H$), 21.5 percent of $D^V_3$, 68.9 percent of 5-methoxy-1,3,5-trimethyl-1,3,5-trivinylsiloxane-1-ol ($CH_3OD^V_3H$), and 2.0 percent of $CH_3OD^V_4H$.

EXAMPLE 3

Octamethylcyclotetrasiloxane ($D_4$) (11 parts) was heated to reflux with 60 parts of methanol and 0.4 part of formic acid for 16 hours. Gas chromatographic analysis showed 29.7 percent of 7-methoxyoctamethyltetrasiloxan-1-ol. ($CH_3OD_4H$), 1.0 percent of of $CH_3OD_3H$, 0.1 percent of $CH_3OD_2H$, 68.7 percent of unreacted $D_4$, and 0.5 percent of a volatile compound, possibly $CH_3ODH$. The rate of formation of $CH_3OD_4H$ is thus about 2 percent per hour at 65° C., with very little byproduct.

EXAMPLE 4

One part of decamethylcyclopentasiloxane ($D_5$) was mixed with 6 parts of methanol and 0.07 part of cyanoacetic acid and kept at room temperature for 48 hours. At the end of this time 6.7 percent of the $D_5$ had been converted to 9 - methoxydecamethylpentasiloxane - 1 - ol ($CH_3OD_5H$) with no byproducts detectable at a level of 0.02 percent. This is a conversion of 3.4 percent per day.

A similar reaction was carried out with 0.15 part of di-n-butylamine. A smaller amount of $CH_3OD_5H$ was produced, along with significant amounts of $CH_3OD_4H$, $CH_3OD_3H$, and $CH_3OD_2H$. In this example the acid catalyst appears to give fewer byproducts.

EXAMPLE 5

One part of $D_3$ was mixed with 7 parts of ethyl alcohol and 0.05 part of formic acid at room temperature. In six hours gas chromatography showed the following (in addition to ethyl alcohol): unreacted $D_3$ 71.0 percent, $C_2H_5OD_3H$ 18.3 percent, a more volatile byproduct 3.8 percent, and a less volatile byproduct 6.9 percent.

EXAMPLE 6

Eleven parts of $D_3$, 60 parts of n-propyl alcohol and 0.4 part of formic acid were heated at reflux (95° C.) for one hour, producing a major amount of $C_3H_7OD_3H$ and minor amounts of two less volatile materials.

EXAMPLE 7

Eleven parts of $D_3$, 60 parts of methanol, and 0.6 part of acetic acid were heated at reflux (65°) for 2 hours. At this time 98 percent of the $D_3$ had been converted to $CH_3OD_3H$, with only traces of by-products ($CH_3OD_2H$ and $CH_3OD_4H$). In comparison with a similar reaction without a catalyst (Example 1) it is clear that the reaction in the presence of acetic acid is not only faster but produces fewer by-products.

EXAMPLE 8

Example 7 was repeated with 0.4 part of formic acid in place of acetic acid, and the reaction was about 96 percent complete in 12 minutes, again with practically no by-products. When reflux was continued for 90 minutes, small amounts of $CH_3OD_2H$, $CH_3OD_4H$ and $CH_3OD_6H$ were formed.

EXAMPLE 9

Example 7 was repeated with 0.5 part of N,N'-dimethyl-piperazine as a catalyst. The reaction was 80 percent complete in 10 minutes with only traces of byproducts. After 2.5 hours of reflux significant amounts of $CH_3OD_2H$, $CH_3OD_4H$, $CH_3OD_5H$, and $CH_3OD_6H$ were formed, $CH_3OD_3H$ still being the major product.

EXAMPLES 10–12

Solutions of 9 parts of $D_3$ in 60 parts of methanol were prepared at room temperature. To these were added 0.5 part of cyanoacetic acid, 0.15 part of ammonia, and 0.3 part of di-n-butylamine. All were effective catalysts and produced 90 percent yields of $CH_3OD_3H$ in less than 30 minutes. In each case significant byproducts appeared only after several hours.

Identification of the minor ingredients in the above Examples 1–12 was made on the basis of gas chromatography. A Varian Aerograph Model 700 Gas Chromatograph was used. The column used has the following description:

Material: Stainless steel
Dimensions: 5 feet x ¼ inch O.D.
Liquid phase: Dimethyl silicone gum (SE–30), 30 percent.
Solid support: 70–80 mesh acid-washed dimethyldichlorosilane-treated firebrick (Gas-chrom RZ), 70 percent.
Helium flow: 60 ml./min.

The reaction times given below are those actually measured. They were reproducible within 1 percent using the above column, although another column might have given somewhat different values. However, the important consideration is relative, rather than absolute retention times. Thus it is known that in a homologous series the ratio of retention times is constant from one member to the next.

RETENTION TIMES AT 170° C.[a]

| Compound: | Retention time, minutes | Ratio[b] |
|---|---|---|
| $D_3$ | 1.35 | |
| $D_4$ | 2.80 | 2.07 |
| $D_5$ | 5.83 | 2.08 |
| $D_6$ | 12.70 | 2.18 |
| Average ratio for D cyclics | | 2.11 |
| $CH_3OD_2H$ | 1.46 | |
| $CH_3OD_3H$ | 3.24 | 2.24 |
| $CH_3OD_4H$ | 6.09 | 2.13 |
| $CH_3OD_5H$ | 14.08 | 2.15 |
| $CH_3OD_6H$ | 31.02 | 2.11 |
| $CH_3OD_7H$ | 64.00 | 2.06 |
| Average ratio for $CH_3OD_xH$ | | 2.14 |
| $HOD_3H$ | 3.43 | |
| $CH_3OD_3H$ | 3.24 | 0.94 |
| $C_2H_5OD_3H$ | 4.08 | 1.26 |
| $C_3H_7OD_3H$ | 5.05 | 1.35 |

[a] Retention times relative to air.
[b] Retention time divided by that of next lower homolog.

It is evident from the data above that the effect of an added D unit in a methoxysiloxanol is almost identical to its effect in the known series of cyclic siloxanes. This regularity provides an invaluable aid to identification. The same is not true in the series $HOD_3H$, $CH_3OD_3H$, $C_2H_5OD_3H$, $C_3H_7OD_3H$, in which the homologous change involves a relatively small part of the molecule.

RETENTION TIMES AT 190° C.

| Compound: | Retention time, minutes | Ratio |
|---|---|---|
| $DV_3$ | 2.52 | |
| $DV_4$ | 6.08 | 2.42 |
| $DV_5$ | 14.77 | 2.43 |
| $CH_3ODV_2H$ | 2.0 | |
| $CH_3ODV_3H$ | 5.38 | 2.69 |
| $CH_3ODV_4H$ | 13.04 | 2.45 |

EXAMPLE 13

A. One hundred parts of a silicone gum (containing 0.1 percent of methylvinylsiloxane) was mixed with 10 parts of $CH_3OD_3H$ and 36 parts of fumed silica (Cab-O-Sil HS–5) in a Sigma mixer at 250° F. No difficulty was encountered and a smooth compound was obtained.

B. A similar compound was prepared with only 6 parts of $CH_3OD_3H$. Some mixing difficulty was encountered, but a smooth compound was eventually obtained.

C. A reference compound was prepared from 100 parts of the same gum, 16 parts of a standard "softener" (antistructure agent) composed of a linear polydimethylsiloxane containing 2.5 percent of OH groups, and 36 parts of Cab-O-Sil HS–5. Attempts to prepare similar compounds with less than 16 parts of the standard softener were unsuccessful because of structure build-up. Thus it is apparent that $CH_3OD_3H$ is approximately twice as effective, on a weight basis, as the standard softener.

Samples of each of the above were successfully cured by heating with dichlorobenzoyl peroxide (1.1 percent of a 50-percent paste, 5 minutes at 240° F.). The following physical test data were obtained after a 16-hour postcure at 450° F.

| | A | B | C |
|---|---|---|---|
| Hardness, Shore A | 43 | 52 | 50 |
| Tensile strength, p.s.i. | 1,200 | 1,000 | 1,100 |
| Elongation, percent | 475 | 400 | 500 |
| Compression set (ASTM D395 Method B) | 23 | 18 | 30 |

It can be seen from these data that the physical properties are approximately equivalent, in general. However, the better (lower) compression set values of the elastomers containing the methoxysiloxanol are clearly evident.

EXAMPLE 14

Six drops of $CH_3OD_3H$ were applied to the surface of a clean glass plate. After 10 minutes at room temperature the surface was washed off with acetone and found not to be water repellent. A second glass plate was treated with six drops of $CH_3OD_3H$ and heated 15 minutes at 105° C. The liquid had evaporated and the surface was found to be somewhat water repellent; water drops on the surface formed a contact angle of about 60°. A third glass plate was treated with 6 drops of $CH_3OD_3H$ and heated for 30 minutes at 150° C., whereby it became water repellent; water drops formed contact angles of about 70° on the surface.

EXAMPLE 15

A fumed silica (Cab-O-Sil MS–7) was mixed with one tenth its weight of $CH_3OD_3H$ and allowed to stand for 16 hours at room temperature. It was not visibly altered and was easily dispersed in water. A similarly treated silica heated for one hour at 110° C. in a closed container became highly hydrophobic and could not be dispersed in water.

EXAMPLE 16

A precipitated calcium polysilicate (Hi-Sil 404) (1.0 part) was heated with 0.15 part of $CH_3OD_3H$ in a closed bottle at 95° C. for two hours, at the end of which it was completely hydrophobic.

Although specific examples are mentioned and have been herein described, it is not intended to limit the invention solely thereto but to include all the variations and modifications falling within the spirit and scope of the appended claims.

The invention claimed is:
1. Alpha-alkoxy-omega-siloxanols having the formula $R'O(R_2SiO)_xH$, in which R is selected from the group consisting of a monovalent hydrocarbon radical, a halogenated monovalent hydrocarbon radical and a cyanoalkyl radical having up to 8 carbon atoms, R' is a radical derived from a primary or secondary alcohol and is selected from the group consisting of alkyl radicals, cycloalkyl radicals, alkenyl radicals, aralkyl radicals and substituted derivatives thereof having up to 20 carbon atoms, and $x$ is a integer of from 2 to 10.

2. The alpha-alkoxy-omega-siloxanols of claim 1, in which at least 50 percent of the R radicals are methyl, R' is an alkyl radical of up to four carbon atoms, and $x$ is an integer of from 3 to 5.

3. The composition of claim 2 wherein the alpha-alkoxy-omega-siloxanol is 5-methoxyhexamethyltrisiloxan-1-ol.

4. The composition of claim 2 wherein the alpha-alkoxy-omega-siloxanol is 7-methoxyoctamethyltetrasiloxan-1-ol.

5. The composition of claim 2 wherein the alpha-alkoxy-omega-siloxanol is 9-methoxydecamethylpentasiloxan-1-ol.

6. The composition of claim 2 wherein the alpha-alkoxy-omega-siloxanol is 5-methoxy-1,3,5-trimethyl-1,3,5-trivinyltrisiloxan-1-ol.

7. A method for preparing an alpha-alkoxy-omega-siloxanol having the formula $R'O(R_2SiO)_xH$ which comprises reacting a cyclic polysiloxane with a primary or secondary alcohol of the formula R'OH in which R is selected from the group consisting of a monovalent hydrocarbon radical, a halogenated monovalent hydrocarbon radical and a cyanoalkyl radical having up to 8 carbon atoms, R' is selected from the group consisting of alkyl radicals, cycloalkyl radicals, alkenyl radicals, aralkyl radicals and substituted derivatives thereof having up to 20 carbon atoms and $x$ is an integer of from 2 to 10 in a mol ratio of alcohol to cyclic polysiloxane of at least 2:1 and at temperatures up to the reflux temperature of the alcohol.

8. The method of claim 7 in which the cyclic polysiloxane has the formula $(R_2SiO)_y$, in which R is selected from the group consisting of a hydrocarbon radical, a halogenated monovalent hydrocarbon radical and a cyanoalkyl radical having up to 8 carbon atoms and $y$ is an integer of from 3 to 10.

9. The method of claim 8 in which a catalyst is added, said catalyst having a $pK_a$ or $pK_b$ value of from 1.5 to 10.

10. The method of claim 9 in which the catalyst is formic acid.

11. The method of claim 9 in which the catalyst is acetic acid.

12. The method of claim 9 in which the catalyst is ammonia.

References Cited

UNITED STATES PATENTS

| | | | |
|---|---|---|---|
| 3,541,126 | 11/1970 | Baronnier et al. | 260—448.8 R |
| 2,842,522 | 7/1958 | Frye | 260—448.8 R X |
| 3,296,198 | 1/1967 | Lukes | 260—448.8 R X |
| 2,826,599 | 3/1958 | Meals | 260—448.8 R |
| 2,746,982 | 5/1956 | Hyde | 260—448.8 R |

DANIEL E. WYMAN, Primary Examiner

P. F. SHAVER, Assistant Examiner

U.S. Cl. X.R.

117—121, 123 D, 126 GS; 260—37 SB